(No Model.) 2 Sheets—Sheet 1.
D. M. HOLMES.
MACHINE FOR MOLDING CONFECTIONERY.
No. 528,722. Patented Nov. 6, 1894.
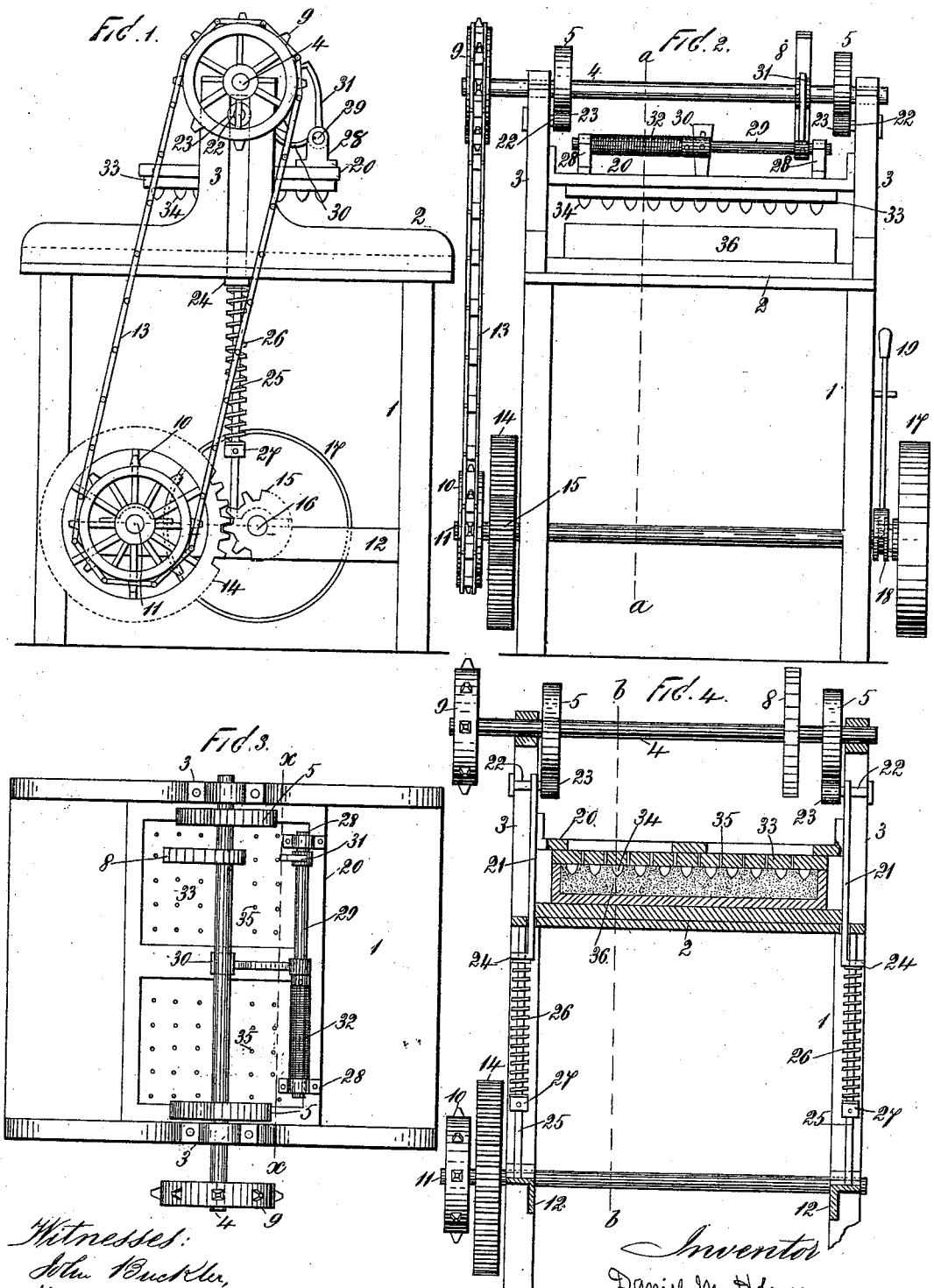
Witnesses:
John Buckler,
Lillian B. Hubbard.
Inventor
Daniel M. Holmes,
By A. M. Pierce,
Attorney.

(No Model.) 2 Sheets—Sheet 2.

D. M. HOLMES.
MACHINE FOR MOLDING CONFECTIONERY.

No. 528,722. Patented Nov. 6, 1894.

Witnesses
John Buckler
Lillian C. Hubbard

Inventor
Daniel M. Holmes.
By A. M. Pierce,
Attorney.

UNITED STATES PATENT OFFICE.

DANIEL M. HOLMES, OF ARLINGTON, NEW JERSEY.

MACHINE FOR MOLDING CONFECTIONERY.

SPECIFICATION forming part of Letters Patent No. 528,722, dated November 6, 1894.

Application filed April 13, 1894. Serial No. 507,399. (No model.)

*To all whom it may concern:*

Be it known that I, DANIEL M. HOLMES, a citizen of the United States, residing in Arlington, Hudson county, State of New Jersey, have invented a new and useful Improvement in Machines for Molding Confectionery, of which the following is a specification.

My invention relates especially to means and mechanism employed for preparing molds for confectionery, and has for its object the provision of an effective machine whereby forms are prepared in starch, or the equivalent, in a cheap and effective manner, said molds being firmer, and the lines cleaner than has heretofore been attained by hand work.

To attain the desired end, my invention consists essentially in certain novel and useful combinations or arrangements of parts, and peculiarities of construction and operation, all of which will be hereinafter first fully described, and then pointed out in the claims.

Figure 5:
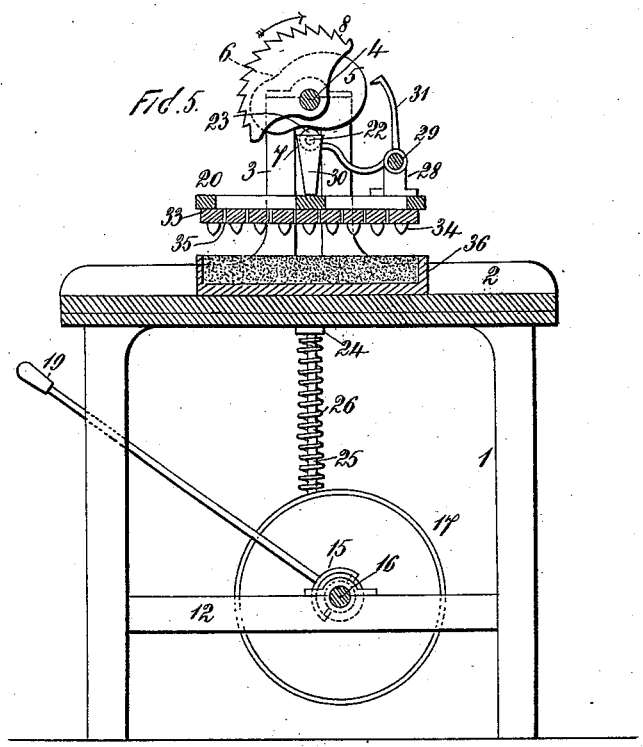
Figure 6:
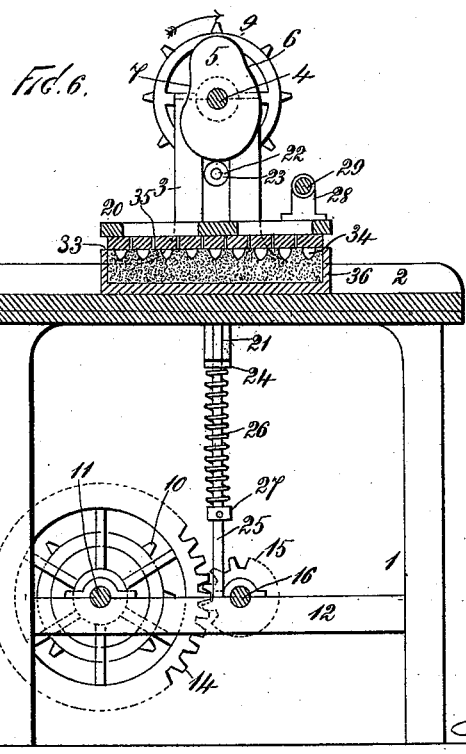

In the accompanying drawings, Figure 1 is a side elevation of the machine. Fig. 2 is an end elevation thereof. Fig. 3 is a plan view. Fig. 4 is a vertical, sectional view at line $x$—$x$ of Fig. 3. Fig. 5 is a vertical, sectional view at line $a$—$a$ of Fig. 2, looking toward the right, and Fig. 6 is a similar view, looking toward the left, at line $b$—$b$ of Fig. 4.

Similar numerals of reference, wherever they occur, indicate corresponding parts in all the figures.

1 is the main frame of the machine, and 2 the bed. Extending upward at each side of the main frame are side bearing frames, 3, wherein is journaled a shaft, 4. Mounted upon this shaft 4 are cams, 5, having depressions, 6 and 7 therein, particularly illustrated in Figs 5 and 6.

8 is a ratchet-segment, also mounted upon the shaft 4.

9 is a sprocket wheel, fixed upon the shaft 4.

10 is a corresponding sprocket wheel, fixed upon a shaft 11 journaled in cross-bars 12 of the main frame of the machine, and 13 is a chain connecting said sprocket wheels.

14 is a gear wheel secured to the shaft 11, and meshing with a gear wheel 15, upon a shaft 16, also journaled in the cross-pieces 12, the said shaft 16 carrying a driving pulley 17, and a clutch 18, to which a manipulating handle 19, is connected.

20 is a frame, provided with side pieces 21 which carry at their upper ends studs, 22, whereon are mounted friction rollers 23 adapted and arranged to come in contact with the cams, 5. The arms 21 connected to the frame 20 extend downward beneath the bed 2, and terminate in horizontal eyes, 24, arranged to play upon vertical rods, 25, fixed to the main frame.

26 are coiled springs, encircling the rods 25, and having their upper extremities bearing against eyes, 24. The tension of these springs 26 is regulated by means of movable collars, 27.

Mounted upon the frame 20 are bearings 28, wherein is mounted a rod, 29, bearing a hammer, 30.

31 is a pawl arm fixed to the rod 29, and arranged to come in contact with the ratchet segment 8, as hereinafter explained.

32 is a spring for regulating the stroke of the hammer 30.

Secured to the under side of the frame 20, is a board 33, whereto are fixed forms, 34, it is desired to produce molds from.

35 are perforations between the forms 34.

36 is a starch box or tray in which the forms are to be impressed.

When constructed and arranged in accordance with the foregoing description, the operation of my confectioner's mold forming machine is as follows: The starch box being placed in the proper location, and the machine started, the parts being in the position shown in Fig. 5, the cams 5 force the frame 20 downward overcoming the springs 26, which tend at all times to hold the rollers 23 in contact with the said cams. As the frame 20 descends, the forms 34 first enter the starch, and the board to which they are secured firmly packs the starch around them, the confined air escaping through the perforations, 35. As soon as the board begins to compress the starch, the segmental ratchet 8 is brought in contact with the ratchet arm 31, causing the hammer 30 to strike upon the frame 20, thus firmly settling the starch around the forms and preventing inequalities in the compression around them. As the shaft 4 continues to carry the cams 5 around, the depressions 6 in their peripheries permit the springs 26 to force the frame 20, the board 33 and attached forms upward a slight distance, the hammer continuing its action, and then the forms are forced completely downward again to their full length. This operation loosens the forms from the starch, and if any particles thereof fall into the molds during the slight elevation of the forms, they are completely compressed by the return movement, and when the forms return to their initial position, the tray of molds is removed, said molds being firm and solid, and the lines of each depression clean and sharp, thus insuring perfectly formed confections.

Having now fully described my invention, what I claim as new therein, and desire to secure by Letters Patent, is—

1. In a device of the character herein specified, a vertically movable form supporting frame, in combination with means for depressing the same, raising it slightly, and then again depressing it before elevating to its initial position; means for jarring the form supporting frame when depressed, and a support for a mold tray beneath the mold frame, substantially as shown and described.

2. In a machine of the character herein specified, a vertically movable form-supporting frame, in combination with means for depressing the same, raising the same slightly, and then again depressing before elevating to its initial position, substantially as shown and described.

3. In a machine of the character herein specified, the combination with a form-supporting frame, normally held elevated by springs, as set forth, of bearings upon said frame, and cams arranged to come in contact with said bearings said cams being provided with depressions 6 and 7, substantially as shown and described.

4. In a machine of the character herein specified, the combination with a depressible form-carrying frame bearing friction rollers, as set forth, of cams shaped as described, and arranged to depress said form-carrying frame, first to a full stroke, permit it to rise slightly, and then again descend to the full stroke, substantially as shown and described.

5. The combination with the depressible form-carrying frame, of a hammer mounted thereon, a pawl arm connected with said hammer, and a segmental ratchet, arranged substantially as shown and described.

DANIEL M. HOLMES.

Witnesses:
A. M. PIERCE,
LILLIAN B. HUBBARD.